United States Patent
Zhang et al.

(10) Patent No.: US 10,306,676 B2
(45) Date of Patent: May 28, 2019

(54) ENHANCED CHANNEL ACCESS MECHANISMS FOR WIDE BAND OPERATION ON UNLICENSED BANDS

(71) Applicant: Huawei Technologies Co., Ltd., Shenzhen (CN)

(72) Inventors: Jiayin Zhang, Kanata (CA); Mohamed Adel Salem, Kanata (CA); Jun Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/213,647

(22) Filed: Dec. 7, 2018

(65) Prior Publication Data

US 2019/0110318 A1    Apr. 11, 2019

Related U.S. Application Data

(63) Continuation of application No. 16/029,065, filed on Jul. 6, 2018, now Pat. No. 10,178,698, which is a
(Continued)

(51) Int. Cl.
*H04B 15/00* (2006.01)
*H04W 74/08* (2009.01)
(Continued)

(52) U.S. Cl.
CPC ...... *H04W 74/0816* (2013.01); *H04B 17/309* (2015.01); *H04W 16/14* (2013.01); *H04W 72/0453* (2013.01); *H04W 72/06* (2013.01)

(58) Field of Classification Search
CPC ............ H04W 74/0816; H04W 16/14; H04W 72/0453; H04W 72/06; H04B 17/039
See application file for complete search history.

(56) References Cited

U.S. PATENT DOCUMENTS

2014/0254510 A1    9/2014 Porat
2015/0049715 A1    2/2015 Yerramalli et al.
(Continued)

FOREIGN PATENT DOCUMENTS

CN    105453478 A    3/2016
WO    2016182387 A1   11/2016

OTHER PUBLICATIONS

3GPP TS 36.213 V13.5.0, 3rd Generation Partnership Project; Technical Specification Group Radio Access Network; "UE Procedures Related to Sidelink," 38 pages, Mar. 2017.
(Continued)

*Primary Examiner* — Tuan Pham
(74) *Attorney, Agent, or Firm* — Slater Matsil, LLP (57) ABSTRACT

A method for dynamically dividing or consolidating sub-bands in-between Clear Channel Assessment (CCA) status measurements upon detection of a CCA bandwidth adjustment condition is provided. The method includes determining at least a single CCA status for at least a single sub-band during a first period, and detecting a CCA bandwidth adjustment condition for dividing the single sub-band into two or more separate sub-bands, where a combination of the two or more separate sub-bands occupies the same frequency band as the single sub-band. The method also includes determining a separate CCA status for each of the two or more separate sub-bands during a second period. An apparatus for performing this method is also provided.

26 Claims, 4 Drawing Sheets

Related U.S. Application Data continuation of application No. 15/610,340, filed on May 31, 2017, now Pat. No. 10,104,693.

(51) Int. Cl.
*H04W 16/14* (2009.01)
*H04W 72/04* (2009.01)
*H04W 72/06* (2009.01)
*H04B 17/309* (2015.01)

(56) References Cited

U.S. PATENT DOCUMENTS

| | | | |
|---|---|---|---|
| 2016/0135224 A1* | 5/2016 | Lee | H04L 27/2607 370/338 |
| 2016/0143010 A1* | 5/2016 | Kenney | H04B 7/0452 370/330 |
| 2016/0149676 A1* | 5/2016 | Jauh | H04W 74/0816 370/329 |
| 2017/0085326 A1 | 3/2017 | Li et al. | |

OTHER PUBLICATIONS

Samsung, "Overview of NR Unlicensed Spectrums," 3GPP TSG-RAN WG1 Meeting #88bis, R1-1706111, Spokane, USA, Feb. 13-17, 2017, 3 pages.

* cited by examiner

ENHANCED CHANNEL ACCESS MECHANISMS FOR WIDE BAND OPERATION ON UNLICENSED BANDS

This application is a continuation of U.S. patent application Ser. No. 16/029,065 filed on Jul. 6, 2018 and entitled "Enhanced Channel Access Mechanisms for Wide Band Operation on Unlicensed Bands," which is a continuation of U.S. patent application Ser. No. 15/610,340 filed on May 31, 2017 and entitled "An Enhanced Channel Access Mechanisms for Wide Band Operation on Unlicensed Bands," both of which applications are hereby incorporated by reference herein as if reproduced in their entireties.

TECHNICAL FIELD

The present invention relates to a system and method for wireless communications, and, in particular, to a system and method for performing a Clear Channel Assessment (CCA) on unlicensed wide bands.

BACKGROUND

Unlicensed wireless protocols may attempt to access wireless channels without centralized coordination and planning, which may lead to collisions between different unlicensed transmissions. One technique for mitigating such collisions is referred to as Carrier-Sense Multiple Access/Collision Avoidance (CSMA/CA). CSMA/CA includes a medium sensing stage, also called Clear Channel Assessment (CCA), during which a device senses a shared channel to determine a CCA status of a sub-band before performing a transmission.

Modern networks may use CCA on a wideband shared channel, which allows a wireless device to transmit or receive data over multiple sub-bands at the same time in order to increase the bandwidth available to the wireless device. Conventional schemes for wideband medium sensing divide the spectrum into a static number of sub-bands, and determine a CCA status on each sub-band individually. Techniques for improving the efficiency and collision avoidance of wideband medium sensing in unlicensed spectrum shared by coexisting wireless networks are desired.

SUMMARY

Technical advantages are generally achieved by embodiments of this disclosure which describe systems and methods for performing an adaptive wideband CCA in accordance with a pattern of interference in unlicensed spectrum.

In accordance with an embodiment, a method for channel access in a wireless communication system is provided. In this example, the method includes determining at least a single CCA status for at least a single sub-band during a first period, and detecting a CCA bandwidth adjustment condition for dividing the single sub-band into two or more separate sub-bands, where a combination of the two or more separate sub-bands occupies the same frequency band as the single sub-band. The method also includes determining a separate CCA status for each of the two or more separate sub-bands during a second period. An apparatus for performing this method is also provided.

In accordance with another embodiment, a method for channel access in a wireless communication system is provided. In this example, the method includes determining separate CCA statuses for two or more sub-bands during a first period, and detecting a CCA bandwidth adjustment condition for consolidating the two or more sub-bands into a single sub-band, where a combination of the two or more sub-bands occupies the same frequency band as the single sub-band. The method also includes determining a single CCA status for the single sub-band during a second period. An apparatus for performing this method is also provided.

In accordance with yet another embodiment, a method for channel access in a wireless communication system in accordance with channel configuration information of coexisting systems is provided. In this example, the method includes receiving beacons and/or preambles and/or discovery reference signals (DRS) transmitted from different coexisting wireless systems, and calculating priorities for a plurality of sub-bands in accordance with channel configuration information in the beacons and/or the preambles received from the different coexisting wireless systems, where sub-bands having higher priorities are less likely to be occupied by a data transmission of the different coexisting wireless systems than sub-bands having lower priorities. The method also includes determining one or more CCA statuses for one or more sub-bands in the plurality of sub-bands in accordance with the priorities for the plurality of sub-bands. An apparatus for performing this method is also provided.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Unlicensed wireless protocols, such as Wi-Fi (e.g., IEEE 802.11 ac) and Long-Term Evolution (LTE) License Assisted Access (LAA) (e.g., $3^{rd}$ Generation Partnership Project (3GPP) Technical Specification 36.213), may attempt to access shared channels without centralized coordination and planning. As a result, unlicensed wireless protocols may be susceptible to collisions between different unlicensed transmissions. One technique for mitigating such collisions is referred to as Carrier-Sense Multiple Access/Collision Avoidance (CSMA/CA). In particular, CSMA/CA includes a medium sensing stage, also called Clear Channel Assessment (CCA), during which a device listens, or otherwise senses, a shared channel to determine a CCA status of a sub-band before performing a transmission. The device should first sense the channel and make sure the channel stays in an idle CCA status for a period of time, i.e., a backoff period. The backoff period can be interrupted if the device detects that the channel changes to a busy CCA status (the energy level of the noise and interference exceeds a predefined threshold). The backoff period may be randomly selected such that devices which simultaneously starting medium sensing on the same channel are likely to wait different lengths of time which avoids the devices from persistently detecting busy CCA statuses on the channel.

Modern networks may use CCA techniques on a wide-band shared channel, which allows a single wireless device to transmit or receive data over multiple sub-bands at the same time in order to increase the bandwidth available to the wireless device. Conventional schemes for using CSMA/CA on a wideband shared channel divide the spectrum into a static number of sub-bands, and determine a CCA status on each sub-band individually.

However, coexisting networks or (in some cases) devices in the same network, may use different sub-band configurations, such that a wide sub-band that a CCA status is determined over spans a narrower sub-band that carries a transmission. This may be problematic for two reasons. If the power level of narrow-band transmission is sufficient to register a busy CCA status over the wide sub-band, then other narrow sub-bands spanned by the wide sub-band may go unused, thereby reducing resource utilization efficiency. Alternatively, if the received signal power level of the narrow-band transmission is insufficient to register a busy CCA status on the wide sub-band, then the device performing the CCA measurement may proceed to perform a transmission over the wide sub-band, and a collision may result. Accordingly, techniques for improving the efficiency and collision avoidance when CCA is used in conjunction with CA techniques over sub-bands shared by coexisting networks are desired.

Aspects of this disclosure provide embodiment techniques that dynamically divide, or consolidate, sub-bands in-between CCA status measurements upon detection of a CCA bandwidth adjustment condition. In one embodiment, a CCA bandwidth adjustment condition prompts a wireless device to divide a wider sub-band (e.g., a single 40 megahertz (MHz) sub-band) into two or more narrower sub-bands (e.g., two 20 MHz sub-bands, four 10 MHz sub-bands, etc.) in-between successive CCA status measurements. In another embodiment, a CCA bandwidth adjustment condition prompts a wireless device to consolidate two or more narrower sub-bands into a wider sub-band in-between successive CCA status measurements. On one hand, dynamically dividing a wider sub-band into two or more narrower sub-bands may increase the accuracy, and granularity, of CCA status measurements, which may improve collision avoidance and/or spectral utilization efficiency when a narrow-band transmission from another wireless device occurs over one of the narrower sub-bands. On the other hand, consolidating two or more narrower sub-bands into a wider sub-band may reduce the number of CCA status measurements that the wireless device is required to perform, thereby reducing processing complexity of the CCA scheme when each of the two or more narrower sub-bands has an idle CCA status during the subsequent period.

Various CCA bandwidth adjustment conditions may prompt a wireless device to divide a wider sub-band into two or more narrower sub-bands, or otherwise consolidate two or more narrower sub-bands into a wider sub-band, in-between successive CCA status measurements. In some instances, a CCA bandwidth adjustment condition may correspond to CCA statuses and/or error rates associated with a set of aggregated sub-bands that are being monitored by a wireless device.

In one example, the wireless device may detect a CCA bandwidth adjustment condition for dividing one of the sub-bands into two or more narrower sub-bands (which is referred to as a CCA bandwidth adjustment condition for dividing sub-bands) when the number of sub-bands in the set of aggregated sub-bands during a reference period, that have an idle CCA status is less than a threshold.

In another example, the wireless device may detect a CCA bandwidth adjustment condition for dividing sub-bands when an error rate associated with one or more data transmissions over one or more sub-bands in a set of aggregated sub-bands during an initial reference period exceeds a threshold error rate.

The error rate may be determined by a feedback from a receiver, such as a hybrid automatic repeat request (HARQ) acknowledgement (ACK), an HARQ negative-acknowledgement (NACK), an HARQ discontinuous transmission (DTX), or an implicit decoding success/failure indication in up-link (UL) grant downlink control information (DCI), etc.

In another example, the wireless device may detect a CCA bandwidth adjustment condition for dividing sub-bands when both an error rate associated with one or more data transmissions over one or more sub-bands in a set of aggregated sub-bands during a reference period exceeds a threshold error rate, and the number of sub-bands in the set of aggregated sub-bands that have an idle CCA status is less than a threshold number of sub-bands.

In another example, the wireless device may detect a CCA bandwidth adjustment condition for dividing sub-bands when all sub-bands in the set of aggregated sub-bands maintain a busy CCA status for at least a threshold number of periods.

In another example, the wireless device may detect a CCA bandwidth adjustment condition for consolidating two or more narrower sub-bands into a single wider sub-band (which is referred to as a CCA bandwidth adjustment condition for consolidating sub-bands) when the number of sub-bands in the set of aggregated sub-bands, that have an idle CCA status is more than a threshold number of sub-bands.

In another example, the wireless device may detect a CCA bandwidth adjustment condition for consolidating sub-bands when an error rate associated with one or more data transmissions over one or more sub-bands in a set of aggregated sub-bands during an initial reference period is smaller than a threshold error rate.

In another example, the wireless device may detect a CCA bandwidth adjustment condition for consolidating sub-bands when both an error rate associated with one or more data transmissions over one or more sub-bands in a set of aggregated sub-bands during an initial reference period is smaller than a threshold error rate, and the number of sub-bands in the set of aggregated sub-bands that have an idle CCA status is more than a threshold number of sub-bands.

When there are a set of coexisting wireless systems, upon detecting a CCA bandwidth adjustment condition for either dividing or consolidating sub-bands, a bandwidth of either each of the two or more separate sub-bands for the dividing condition, or the single sub-band for the consolidating condition, may correspond to bandwidths used by the set of coexisting wireless systems during an initial reference period.

In one example, the bandwidth determined during the next period may equal the minimum operation bandwidth used by the set of coexisting wireless systems during an initial reference period.

In another example, the bandwidth determined during the next period may equal an operation bandwidth used by more than a threshold number of coexisting wireless systems in the set of coexisting wireless systems during an initial reference period.

Other aspects of this disclosure provide embodiment techniques that calculate priorities for a plurality of sub-bands when a wireless device receives beacons and/or preambles transmitted from different coexisting wireless systems. Sub-bands that have higher priorities are less likely to be occupied by a data transmission of the different coexisting wireless systems than sub-bands having lower priorities.

The wireless device may determine one or more CCA statuses for one or more sub-bands in the plurality of sub-bands in accordance with the calculated priorities. In one example, the wireless device may determine CCA statuses for one subset of sub-bands in the plurality of sub-bands, which have higher priorities, and not determine CCA statuses for another subset of sub-bands in the plurality of sub-bands, which have lower priorities. In another example, the wireless device may determine a CCA status for each of the plurality of sub-bands sequentially in a descending order of the priorities for the plurality of sub-bands.

The above aspects and other inventive aspects are discussed in greater detail below.

Figure 1:
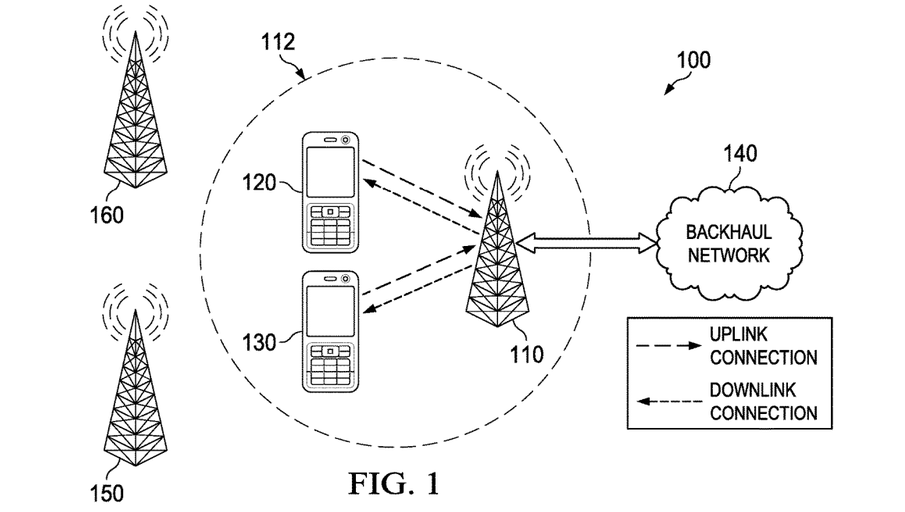
FIG. 1 illustrates an embodiment network architecture with interference in unlicensed spectrum.

FIG. 1 illustrates a network 100 for communicating data and potential sources of interference. The network 100 comprises a base station 110 having a coverage area 112, a UE 120, a UE 130, and a backhaul network 140. As shown, the base station 110 establishes uplink (dashed line) and/or downlink (dotted line) connections with both the UE 120 and the UE 130, which serve to carry data from the UEs to the base station 110 and vice-versa. Data carried over the uplink/downlink connections may include data communicated between the UEs and the base station 110, as well as data communicated to/from a remote-end (not shown) by way of the backhaul network 140. A base station 150 and a base station 160 do not communicate directly with the UE 120, but base stations 150 and 160 both occupy the same shared channel as the network 100. The base station 150 uses a same wireless protocol as the network 100 while the base station 160 uses a different one. The connections between the UE 120 and the base station 110 may be interfered by the UE 130, the base station 150 or the base station 160. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), LTE License Assisted Access (LAA), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Figure 2:
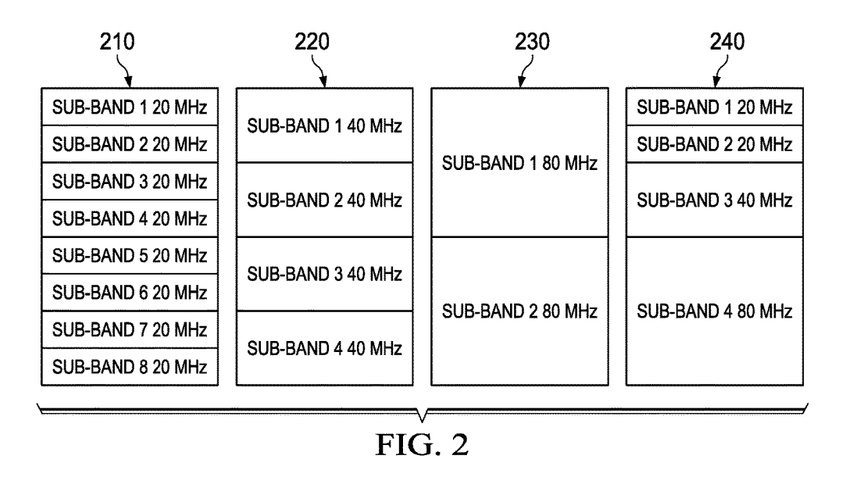
FIG. 2 illustrates an embodiment sub-band configuration for a CCA.

Different sub-band configurations may be used to perform CCA over a shared channel. In one embodiment, a wireless device may select a sub-band configuration, from a set of predefined sub-band configurations, for a given shared channel, and then determine a CCA status for each sub-band defined by the selected sub-band configuration prior to transmitting data over idle sub-bands of the shared channel. Each of the predefined sub-band configurations may divide the shared channel into a different combination of sub-bands. FIG. 2 illustrates different sub-band configurations 210, 220, 230, and 240 for a 160 MHz shared channel. As shown, the sub-band configuration 210 divides the shared channel into eight 20 MHz sub-bands, the sub-band configuration 220 divides the shared channel into four 40 MHz sub-bands, the sub-band configuration 230 divides the shared channel into two 80 MHz sub-bands, and the sub-band configuration 240 divides the shared channel into two 20 MHz sub-bands, one 40 MHz sub-band, and one 80 MHz sub-band. Although sub-bands in each of the respective sub-band configurations 210, 220, 230, and 240 are continuous with one another in the frequency domain, it should be appreciated that some sub-band configurations may include sub-bands that are non-continuous in the frequency domain such that at least two of the sub-bands are separated by a gap (e.g., a guard band, etc.). In some examples, sub-bands in different sub-band configurations may be interleaved with one another in the frequency domain. Other examples are also possible.

Figure 3:
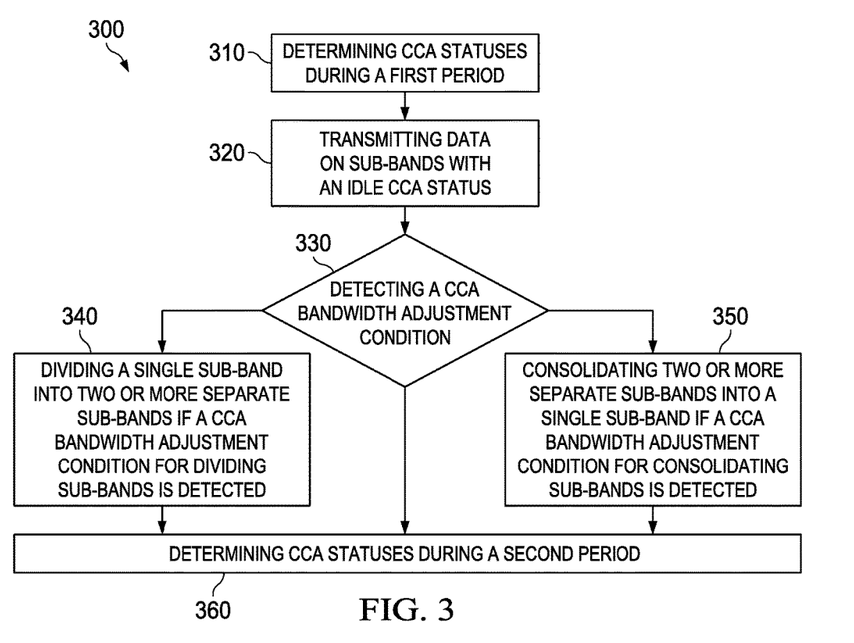
FIG. 3 illustrates a flowchart of an embodiment method.

FIG. 3 illustrates a method 300 for performing the proposed embodiment techniques in a wireless network. As shown, the method 300 begins with step 310, where a wireless device is using an initial sub-band configuration during a first period, which divides a shared channel into a set of aggregated sub-bands. In step 310, the wireless device determines at least a single CCA for at least a single sub-band in the set of aggregated sub-bands. If an idle CCA status is detected on one or more sub-bands, the method 300 proceeds to step 320 where the wireless device may start data transmission on the one or more sub-bands with an idle CCA status during the first period. The method 300 proceeds to step 330, where the wireless device may detect a CCA bandwidth adjustment condition, which may indicate a pattern of interference on the shared channel has changed. The wireless device may choose to update the sub-band configuration accordingly.

In some instances, the method 300 proceeds to step 340, where the CCA bandwidth adjustment condition prompts the wireless device to divide a single wider sub-band into two or more separate narrower sub-bands. A combination of the two or more separate narrower sub-bands occupies the same frequency band as the single wider sub-band. In some other instances, the method 300 proceeds to step 350, where the CCA bandwidth adjustment condition prompts the wireless device to consolidate two or more separate narrower sub-bands into a single wider sub-band. In both steps 340 and 350, upon detection of the CCA bandwidth adjustment condition, the wireless device either divides or consolidates sub-bands and updates the sub-band configuration.

Then the method 300 proceeds to step 360 where the wireless device performs CCA measurements for at least one sub-band according to the updated sub-band configuration during a second period. In some other instances, the CCA bandwidth adjustment condition may not be detected if the change of pattern of the interference on the shared channel is not significant enough. In this case, the method 300 may proceed from step 330 to step 360 directly, and the wireless device performs CCA measurements during the second period using the same sub-band configuration as in the first period.

CCA bandwidth adjustment conditions for dividing or consolidating sub-bands may be based on CCA status measurements corresponding to a given sub-band, or a given set of aggregated sub-bands, during a previous CCA period/interval. In one embodiment, a CCA bandwidth adjustment condition for dividing sub-bands may be detected when less than a certain number, or less than a certain percentage (e.g., 75%) of the sub-bands in a given set of aggregated sub-bands have an idle CCA status. For example, the wireless device is currently using the sub-band configuration 220 in FIG. 2. If a previous CCA status measurement shows that sub-bands 1 and 4 are idle while sub-bands 2 and 3 are busy, then the percentage of idle status is 50% which is less than the 75% threshold. Such measurement results may indicate that the interference on the shared channel is more severe than previously expected. In this case, the wireless device may choose to divide each 40 MHz sub-band into two 20 MHz sub-bands so that the sub-band configuration 210 in FIG. 2 will be used during the next CCA status measurement. The next CCA status measurement will be performed with a finer granularity, especially for sub-bands 3-6 in the sub-band configuration 210. In another embodiment, a CCA bandwidth adjustment condition for consolidating sub-bands may be detected when more than a certain number, or more than a certain percentage of the sub-bands in the given set of aggregated sub-bands have an idle CCA status. In the above example where the sub-band configuration 220 is used during the previous CCA status measurement, if three out of four sub-bands obtain an idle status (the 75% threshold is reached), then the wireless device may choose to consolidate sub-bands 1 and 2 into one sub-band, and consolidate sub-bands 3 and 4 into another sub-band. As a result, the sub-band configuration 230 in FIG. 2 will be used during the next CCA status measurement, which may reduce the processing complexity of the measurement.

In an embodiment, the wireless device may not perform dividing or consolidating on some sub-bands in the set of aggregated sub-bands, and may do so on some other sub-bands in the set of aggregated sub-bands, even on only one specific sub-band for the dividing case.

In an embodiment, if a CCA bandwidth adjustment condition for consolidating sub-bands is detected consecutively for several times, the wireless device may choose to consolidate sub-bands every time till eventually all the aggregated sub-bands are combined to one if the sub-band configuration allows so.

In an embodiment, the CCA bandwidth adjustment condition is detected if the wireless device performs consecutive CCA status measurements for a threshold number of times and each time the CCA measurement results satisfy a predefined requirement. In this case, the wireless device may not perform consolidating until the threshold number is reached. In one example, the CCA bandwidth adjustment condition is detected if the wireless device performs three consecutive CCA status measurements and every time all sub-bands have an idle status. In another example, once the threshold number is reached, the wireless device may consolidate all the aggregated sub-bands into one single sub-band.

As shown in step 320 in FIG. 3, during an initial reference period the wireless device may transmit data on one or more sub-bands with an idle CCA status. The CCA bandwidth adjustment condition may correspond to an error rate of one or more data transmissions over such sub-bands. The error rate of the one or more initial data transmissions may be determined by a feedback from a receiver of the transmissions. For instances, in 3GPP protocols, the receiver may provide feedbacks through an HARQ ACK, an HARQ NACK, an HARQ DTX, or an implicit decoding success indication in UL grant DCI. Different types of feedbacks in other wireless protocols are also possible. In one embodiment, when the error rate associated with the one or more data transmissions over one or more sub-bands in a set of aggregated sub-bands during the initial reference period exceeds a threshold error rate, a CCA bandwidth adjustment condition is detected, which prompts the wireless device to divide at least one wider sub-band in the set of aggregated sub-bands into two or more narrower sub-bands. In another embodiment, when the error rate associated with the one or more data transmissions over one or more sub-bands in the set of aggregated sub-bands during the initial reference period is smaller than the threshold error rate, another CCA bandwidth adjustment condition is detected, which prompts the wireless device to consolidate two or more narrower sub-bands in the set of aggregated sub-bands into a wider sub-band. In another embodiment, the wireless device may perform dividing or consolidating only on sub-bands that correspond to the initial data transmissions.

The CCA bandwidth adjustment condition may correspond to a combination of the error rate of the one or more data transmissions over the one or more sub-bands in the set of aggregated sub-bands, and the number of sub-bands in the set of aggregated sub-bands that have an idle CCA status. In an embodiment, the CCA bandwidth adjustment condition for dividing sub-bands is detected when both the error rate of the one or more data transmissions exceeds a threshold error rate, and the number of sub-bands in the set of aggregated sub-bands having an idle CCA status is less than a threshold number of sub-bands. The wireless device may divide every sub-band in the set of aggregated sub-bands, and choose an available sub-band configuration with the largest number of sub-bands. In another embodiment, the CCA bandwidth adjustment condition for consolidating sub-bands is detected when both the error rate of the one or more data transmissions is smaller than another threshold error rate, and the number of sub-bands in the set of aggregated sub-bands having an idle CCA status exceeds another threshold number of sub-bands. The wireless device may consolidate all the aggregated sub-bands into one sub-band if the sub-band configuration allows so.

It should be appreciated that the reference period during which a CCA is performed may or may not be the same as the one during which an error rate of initial data transmissions is measured. In one example, both the CCA and the error rate measurement are performed on the first slot or sub-frame in the Maximum Channel Occupancy Time (MCOT). In another example, the CCA occurs on the first slot of the MCOT while the error rate is measured for all transmissions during the whole MCOT.

The CCA bandwidth adjustment condition may also be determined based on the channel configuration information of coexisting wireless systems. Some unlicensed wireless protocols broadcast information about the frequency bands they operate on. For example, a Wi-Fi AP transmits a beacon frame (or a preamble if later versions of Wi-Fi protocols are supported) periodically, in order to announce the existence of this AP and some configuration parameters such as the service set identifier (SSID), channels and capabilities. As for LAA and enhance LAA (eLAA) LTE protocols, the broadcast information carried by a physical broadcast channel (PBCH) or a physical downlink control channel (PDCCH) indicates the carrier frequencies and how the resources are allocated. If the wireless device has the ability to receive and decode these broadcast messages from surrounding coexisting wireless systems, it may adjust the sub-band configuration and perform CCA accordingly. In an embodiment, the wireless device may determine the minimum operation bandwidth that the coexisting wireless systems have been using for a predefined reference period (e.g. 100 milliseconds), and then choose this minimum operation bandwidth as the bandwidth of the CCA sub-bands for the next period. In another embodiment, the wireless device may determine that a threshold number of coexisting wireless systems have been using sub-bands with bandwidths larger than an operation bandwidth for a previous period of time. Then the wireless device may choose this operation bandwidth as the bandwidth of the CCA sub-bands for the next period.

Figure 4:
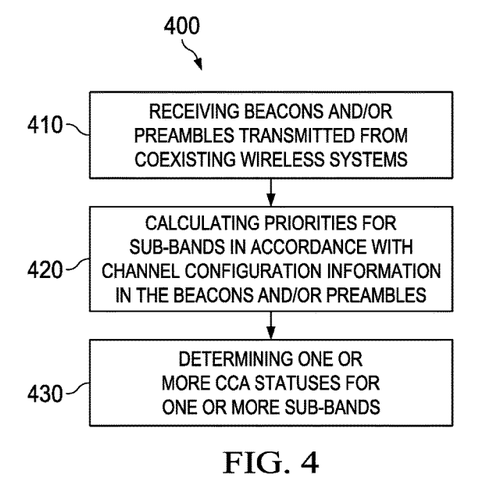
FIG. 4 illustrates a flowchart of another embodiment method.

FIG. 4 illustrates a method 400 for performing an embodiment technique to calculate sub-band priorities in a wireless network. In some embodiments, based on the channel configuration information of coexisting wireless systems, the wireless device may evaluate which sub-band within the shared channel is less likely to be occupied by a data transmission of the coexisting wireless systems. The less likely these sub-bands are occupied, the more likely they are in an idle CCA status and are ready to be accessed by the wireless device; hence the wireless device may assign higher priorities to these sub-bands. As shown in FIG. 4, the method 400 begins with step 410, where a wireless device receives beacons and/or preambles transmitted from different coexisting wireless systems, which may include channel configuration information of the coexisting wireless systems. The wireless device may decode the channel configuration information and use that to evaluate a plurality of sub-bands in the shared spectrum.

Figure 5:
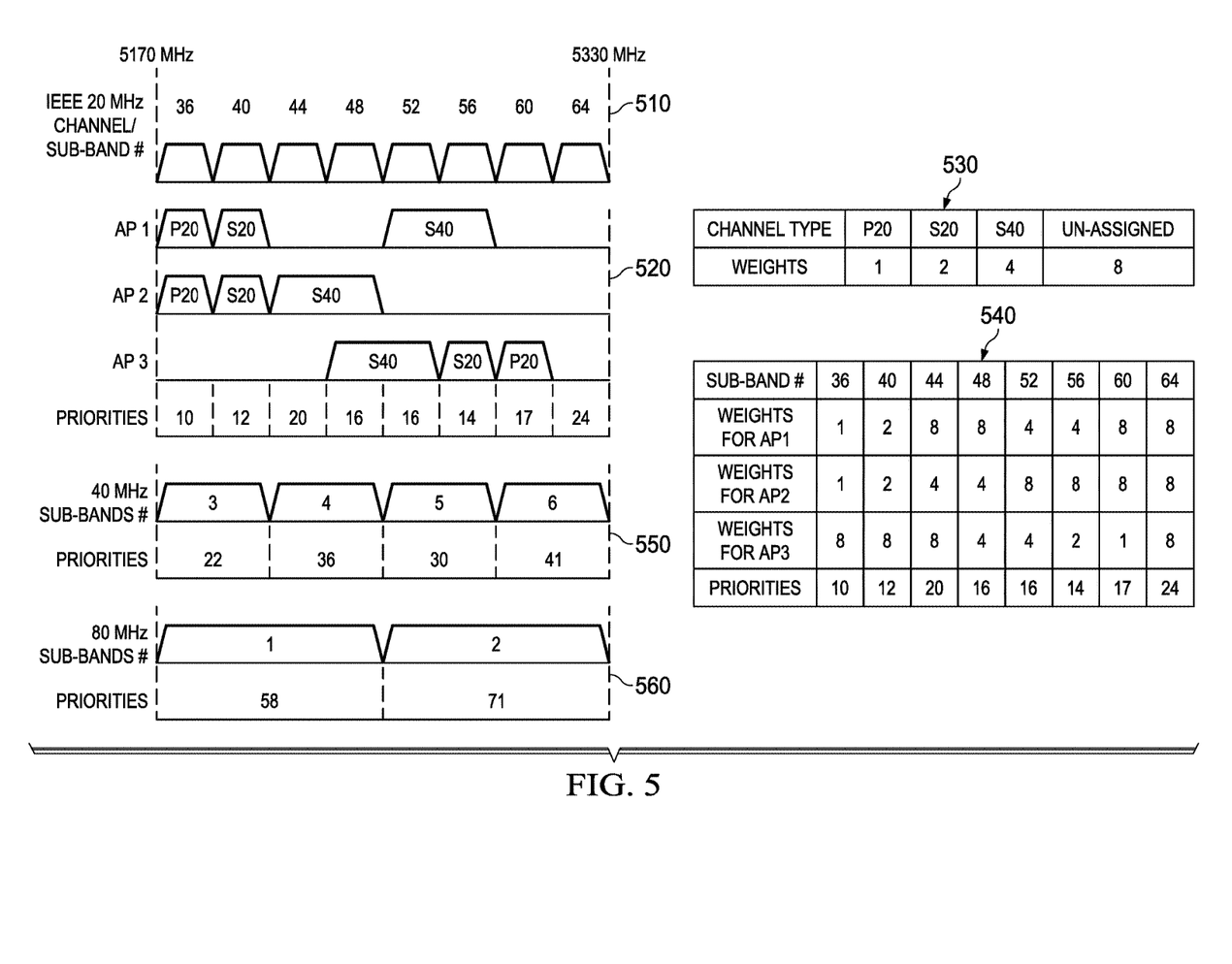
FIG. 5 illustrates calculation of sub-band priorities in an embodiment method.

In step 420, the wireless device calculates priorities for the plurality of sub-bands in accordance with channel configuration information in the beacons and/or the preambles received from the different coexisting wireless systems. FIG. 5 illustrates how the priorities are calculated in an environment of three coexisting Wi-Fi APs. In this example, each Wi-Fi AP can operate on three types of channels—a primary 20 MHz (P20) channel, a secondary 20 MHz (S20) channel, and a secondary 40 MHz (S40) channel.

A Wi-Fi AP may look for a wider frequency band for data transmission. In accordance with IEEE 802.11n, the AP will first assess its P20 channel. If the P20 channel is clear or idle, the AP will assess the adjacent S20 channel. If the S20 channel is busy, the AP uses only P20 for a 20 MHz transmission. If the S20 is clear, the AP uses both P20 and S20 for a 40 MHz transmission. Then the AP will assess the S40 channel adjacent to the combination of P20 and S20. If the S40 channel is clear, the AP uses all three channels for an 80 MHz transmission. In some Wi-Fi protocols (e.g., IEEE 802.11ac) a secondary 80 MHz (S80) channel may be further assessed for a 160 MHz transmission. In some other emerging Wi-Fi protocols (e.g., IEEE 802.11ay), the primary and secondary channels may not be adjacent to each other, which is referred to as channel aggregation.

In FIG. 5, only the first three types of channels are used. The whole 160 MHz frequency band (from 5170 MHz to 5330 MHz) is divided into eight 20 MHz sub-bands or channels as shown in subfigure 510. Subfigure 520 illustrates the P20, S20 and S40 channels allocated for each AP. Note that even though the three channels of each AP do not overlap with each other, an AP's channel may overlap with a channel of a different AP as these APs share the same frequency. It is assumed that these three APs broadcast their channel configurations. The wireless device may receive and decode the configurations, and then calculate the priority for each sub-band, and hence for each consolidated set of sub-bands, using below methods. Table 530 defines different weights for each channel type. If sub-band A is assigned as a P20 channel for an AP, then sub-band A gets weight 1 for the AP. If sub-band B is assigned as a S20 channel for an AP, then sub-band B gets weight 2 for the AP. If sub-bands C and D are assigned as a S40 channel for an AP, then the weights sub-bands C and D get for the AP are both 4. If sub-band E is not selected by an AP as any type of channel, then sub-band E gets weight 8 for the AP. The first row of table 540 denotes the sub-band indices. Rows 2-4 of table 540 correspond to the weights each sub-band gets for the three coexisting Aps. Each column of table 540 corresponds to a sub-band. The priority of a sub-band is calculated by adding together the weights this sub-band gets from all APs. The last row of table 540 provides the calculated priorities.

The method 400 proceeds to step 430, where the wireless device determines one or more CCA statuses for one or more sub-bands in the plurality of sub-bands in accordance with the priorities for the plurality of sub-bands. Sometimes the wireless device has a small amount of data to send so the transmission only requires part of the shared spectrum. In this case, the CCA status for each of the sub-bands may be determined sequentially in a descending order of the priorities of the sub-bands. Hence, sub-bands that are more likely to have an idle CCA status are measured and selected first. Once the wireless device selects enough idle sub-bands for the data transmission, it may stop performing additional CCA status measurements on the rest of sub-bands, which improves the efficiency. In the example of FIG. 5, the wireless device may first start the CCA status measurement on sub-band 64 which has the highest priority 24. Then the wireless device may choose sub-band 44 (with priority 20), and sub-bands 60 (with priority 17), and so on and so forth till enough sub-bands are selected. In another embodiment, the wireless device may abandon some low priority sub-bands in the beginning, and only perform CCA status measurements on some selected sub-bands with higher priorities. In the example of FIG. 5, the wireless device may ignore the sub-bands with priorities lower than 20 and only perform CCA status measurements on sub-bands 64 and 44.

In another embodiment, the wireless device may consolidate a set of sub-bands. The priority of a consolidated sub-band can be calculated as the sum of the priorities of each separate sub-band in the set. The 160 MHz frequency band in FIG. 5 can be divided into four 40 MHz sub-bands or two 80 MHz sub-bands, as illustrated by subfigures 550 and 560, respectively. A 40 MHz sub-band is obtained by consolidating two adjacent 20 MHz sub-bands, and an 80 MHz sub-band is obtained by consolidating four adjacent 20 MHz sub-bands. The priorities for each sub-band configuration are provided on the bottom of subfigures 550 and 560, respectively.

In another embodiment, the priority may be combined with the CCA bandwidth adjustment method illustrated in FIG. 3. If the CCA bandwidth adjustment condition for dividing sub-bands is detected, the wireless device may first divide a wider sub-band into a set of narrower sub-bands. Then the wireless device may determine how to perform CCA on the set of narrower sub-bands in accordance with the priorities of these narrower sub-bands. For example, the wireless device obtains a busy CCA status on an 80 MHz sub-band (e.g., sub-band 1 in subfigure 560). Then the wireless device may decide to transmit data on a narrower sub-band in order to avoid a potential interference. The wireless device may divide the 80 MHz sub-band into two 40 MHz sub-bands (e.g., sub-bands 3 and 4 in subfigure 550), and choose one for data transmission. Instead of performing CCA status measurements on both 40 MHz sub-bands, and then selecting one sub-band with an idle CCA status, the wireless device may just directly perform CCA status measurement on the 40 MHz sub-band with the highest priority (e.g., sub-band 4 with priority 36). This is more efficient because the sub-band with a higher priority is less likely to be occupied. If the CCA status on the sub-band with the highest priority is still busy, the wireless device may perform CCA on the sub-band with the second highest priority.

Although in this disclosure some embodiments are described in the context of a UE obtaining uplink channel access, it should be appreciated that such embodiments are not so limited and are equally applicable to downlink channel access in a perspective of a base station, and vice versa.

Figure 6:
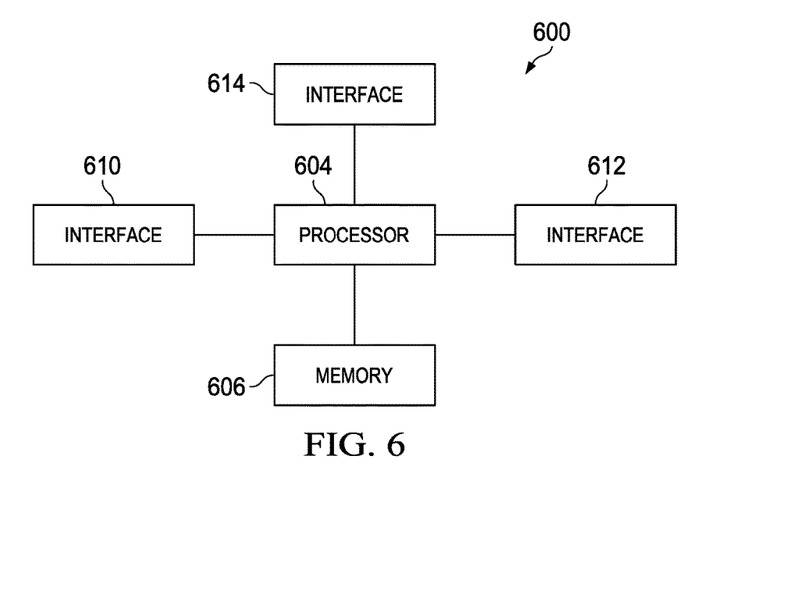
FIG. 6 illustrates a block diagram of an embodiment processing system.

FIG. 6 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 6. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, and 614 may be any component or collection of components that allow the processing system 600 to communicate with other devices/components and/or a user. For example, one or more of the interfaces 610, 612, and 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a UE, a PC, a tablet, a wearable communications device (e.g., a smartwatch, etc.), or any other device adapted to access a telecommunications network.

Figure 7:
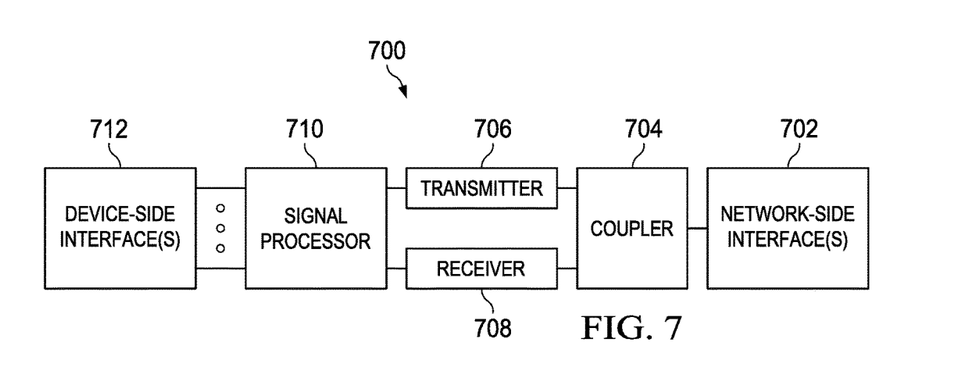
FIG. 7 illustrates a block diagram of an embodiment a transceiver.

In some embodiments, one or more of the interfaces 610, 612, 614 connects the processing system 600 to a transceiver adapted to transmit and receive signaling over the telecommunications network. FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., LTE, etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for channel access in a wireless communication system, the method comprising:
   receiving, by a wireless device, beacons and/or preambles transmitted from different coexisting wireless systems;
   calculating priorities for a plurality of sub-bands in accordance with channel configuration information in the beacons and/or the preambles received from the different coexisting wireless systems, wherein sub-bands having higher priorities are less likely to be occupied by a data transmission of the different coexisting wireless systems than sub-bands having lower priorities; and
   determining one or more Clear Channel Assessment (CCA) statuses for one or more sub-bands in the plurality of sub-bands in accordance with the priorities for the plurality of sub-bands.

2. The method of claim 1, wherein determining the one or more CCA statuses for the one or more sub-bands in the plurality of sub-bands in accordance with the priorities comprises:
   determining CCA statuses for a first subset of sub-bands in the plurality of sub-bands without determining CCA statuses for a second subset of sub-bands in the plurality of sub-bands, the first subset of sub-bands having higher priorities than the second subset of sub-bands.

3. The method of claim 1, wherein determining the one or more CCA statuses for the one or more sub-bands in the plurality of sub-bands in accordance with the priorities comprises:
   determining a CCA status for each of the plurality of sub-bands sequentially, in a descending order of the priorities for the plurality of sub-bands.

4. The method of claim 1, wherein an idle CCA status on a sub-band is determined in response to at least one of detecting that an energy level of noise and interference on the sub-band is smaller than a first threshold and detecting that a power level of a received preamble is smaller than a second threshold.

5. The method of claim 1, wherein a busy CCA status on a sub-band is determined in response to at least one of detecting that an energy level of noise and interference on the sub-band is larger than a first threshold and detecting that a power level of a received preamble is larger than a second threshold.

6. The method of claim 1, wherein the channel configuration information comprises classifications of the plurality of sub-bands by each of the different coexisting wireless systems.

7. The method of claim 6, wherein the priorities for the plurality of sub-bands are calculated in accordance with the classifications of the plurality of sub-bands by each of the different coexisting wireless systems.

8. The method of claim 6, wherein a first sub-band is more likely to be occupied by a first coexisting wireless system than a second sub-band, the first sub-band classified as a first category by the first coexisting wireless system, the second sub-band classified as a second category by the first coexisting wireless system, the first coexisting wireless system being one of the different coexisting wireless systems, the first sub-band and the second sub-band belonging to the plurality of sub-bands.

9. The method of claim 1, wherein the one or more sub-bands belong to a set of aggregated sub-bands occupying a continuous frequency band.

10. The method of claim 1, further comprising:
    calculating a priority of an aggregated sub-band, the aggregated sub-band comprising a first sub-band and a second sub-band, the first sub-band is adjacent to the second sub-band.

11. The method of claim 10, wherein the priority of the aggregated sub-band is a sum of a priority of the first sub-band and a priority of the second sub-band.

12. The method of claim 11, wherein the aggregated sub-band is divided into a set of sub-bands in response to detecting a CCA bandwidth adjustment condition for dividing sub-bands, and wherein CCA statuses for the set of sub-bands are determined in accordance with priorities of the set of sub-bands.

13. The method of claim 11, wherein a CCA status of the aggregated sub-band is determined in accordance with the priority of the aggregated sub-band in response to detecting a CCA bandwidth adjustment condition for consolidating the first sub-band and the second sub-band.

14. A wireless device comprising:
    a non-transitory memory storage comprising instructions; and
    a processor in communication with the non-transitory memory storage, wherein the processor executes the instructions to:
    receive beacons and/or preambles transmitted from different coexisting wireless systems;
    calculate priorities for a plurality of sub-bands in accordance with channel configuration information in the beacons and/or the preambles received from the different coexisting wireless systems, wherein sub-bands having higher priorities are less likely to be occupied by a data transmission of the different coexisting wireless systems than sub-bands having lower priorities; and
    determine one or more Clear Channel Assessment (CCA) statuses for one or more sub-bands in the plurality of sub-bands in accordance with the priorities for the plurality of sub-bands.

15. The wireless device of claim 14, wherein the instructions to determine the one or more CCA statuses for the one or more sub-bands in the plurality of sub-bands in accordance with the priorities comprise:

instructions to determine CCA statuses for a first subset of sub-bands in the plurality of sub-bands without determining CCA statuses for a second subset of sub-bands in the plurality of sub-bands, the first subset of sub-bands having higher priorities than the second subset of sub-bands.

16. The wireless device of claim 14, wherein the instructions to determine the one or more CCA statuses for the one or more sub-bands in the plurality of sub-bands in accordance with the priorities comprise:
instructions to determine a CCA status for each of the plurality of sub-bands sequentially, in a descending order of the priorities for the plurality of sub-bands.

17. The wireless device of claim 14, wherein an idle CCA status on a sub-band is determined in response to detecting that an energy level of noise and interference on the sub-band is smaller than a threshold level.

18. The wireless device of claim 14, wherein a busy CCA status on a sub-band is determined in response to detecting that an energy level of noise and interference on the sub-band is larger than a threshold level.

19. The wireless device of claim 14, wherein the channel configuration information comprises classifications of the plurality of sub-bands by each of the different coexisting wireless systems.

20. The wireless device of claim 19, wherein the priorities for the plurality of sub-bands are calculated in accordance with the classifications of the plurality of sub-bands by each of the different coexisting wireless systems.

21. The wireless device of claim 19, wherein a first sub-band is more likely to be occupied by a first coexisting wireless system than a second sub-band, the first sub-band classified as a first category by the first coexisting wireless system, the second sub-band classified as a second category by the first coexisting wireless system, the first coexisting wireless system being one of the different coexisting wireless systems, the first sub-band and the second sub-band belonging to the plurality of sub-bands.

22. The wireless device of claim 14, wherein the one or more sub-bands belong to a set of aggregated sub-bands occupying a continuous frequency band.

23. The wireless device of claim 14, wherein the processor further executes instructions to:
calculate a priority of an aggregated sub-band, the aggregated sub-band comprising a first sub-band and a second sub-band, the first sub-band is adjacent to the second sub-band.

24. The wireless device of claim 23, wherein the priority of the aggregated sub-band is a sum of a priority of the first sub-band and a priority of the second sub-band.

25. The wireless device of claim 24, wherein the aggregated sub-band is divided into a set of sub-bands in response to detecting a CCA bandwidth adjustment condition for dividing sub-bands, and wherein CCA statuses for the set of sub-bands are determined in accordance with priorities of the set of sub-bands.

26. The wireless device of claim 24, wherein a CCA status of the aggregated sub-band is determined in accordance with the priority of the aggregated sub-band in response to detecting a CCA bandwidth adjustment condition for consolidating the first sub-band and the second sub-band.

* * * * *